Figure 1:
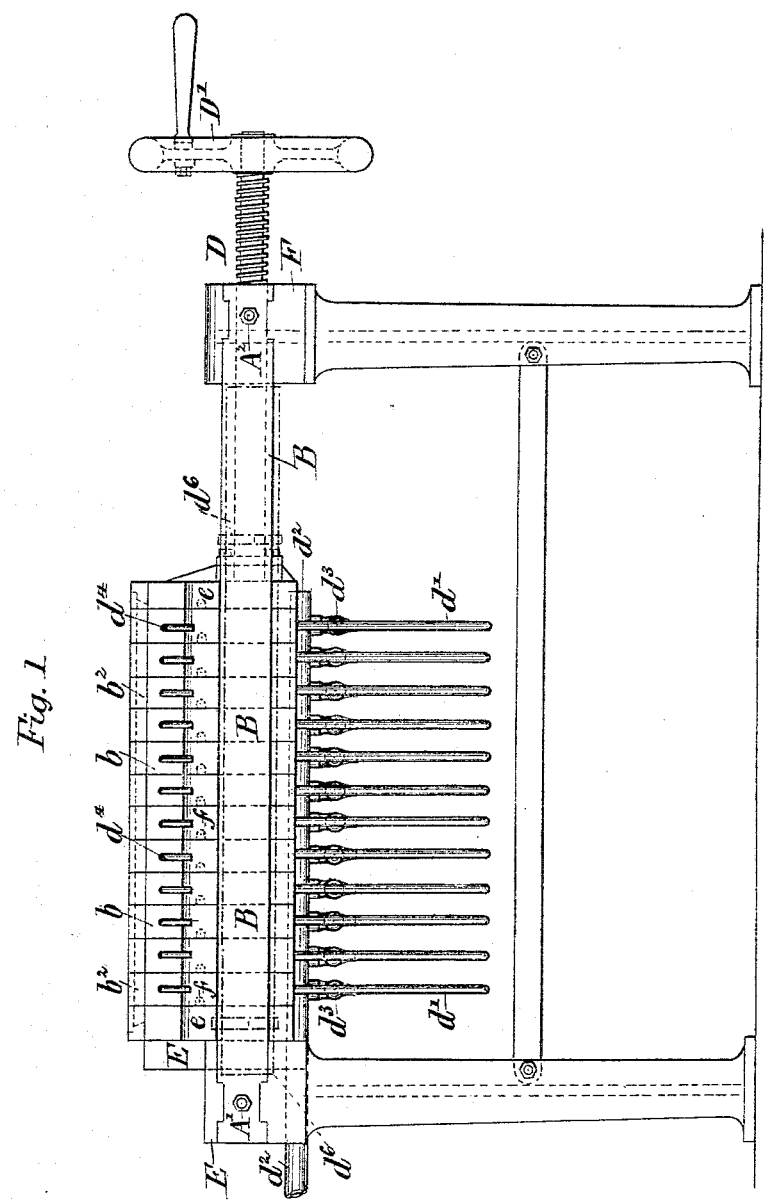

(No Model.) 3 Sheets—Sheet 1.

H. J. & G. H. FENNER.
APPARATUS FOR THE MANUFACTURE OF NAPHTHALINE.

No. 399,139. Patented Mar. 5, 1889.

(No Model.) 3 Sheets—Sheet 2.

H. J. & G. H. FENNER.
APPARATUS FOR THE MANUFACTURE OF NAPHTHALINE.

No. 399,139. Patented Mar. 5, 1889.

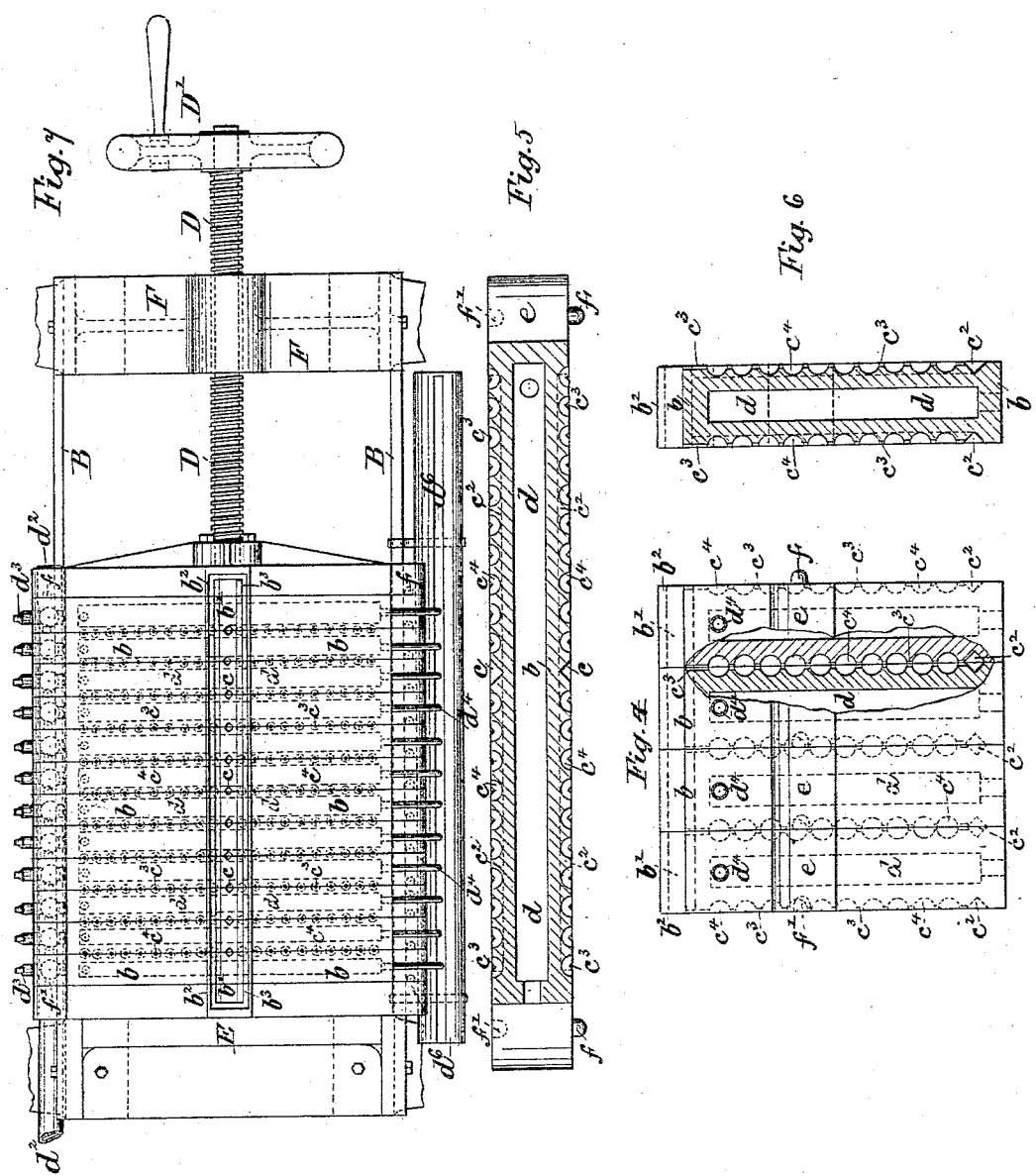

UNITED STATES PATENT OFFICE.

HENRY JAMES FENNER, OF BROOKEHOLME, ST. JOHN'S PARK, BLACKHEATH, COUNTY OF KENT, AND GEORGE HAMILTON FENNER, OF 38 HILLSBORO ROAD, DULWICH, COUNTY OF SURREY, ENGLAND.

APPARATUS FOR THE MANUFACTURE OF NAPHTHALINE.

SPECIFICATION forming part of Letters Patent No. 399,139, dated March 5, 1889.

Application filed August 21, 1888. Serial No. 283,348. (No model.) Patented in England October 14, 1887, No. 14,085.

*To all whom it may concern:*

Be it known that we, HENRY JAMES FENNER, gentleman, of Brookeholme, St. John's Park, Blackheath, in the county of Kent, England, and GEORGE HAMILTON FENNER, chemical engineer, of 38 Hillsboro Road, Dulwich, in the county of Surrey, England, both subjects of the Queen of Great Britain, have invented certain new and useful Improvements in Apparatus for Manufacturing Naphthaline into Forms Suitable for Use in Illumination, of which the following is a specification.

Naphthaline destined for carbureting purposes is ordinarily prepared in the form of cylindrical sticks or candles, which candles are chopped up into shorter lengths in order to facilitate packing or filling into the receptive vessels or carbureting-chambers, or alternatively the naphthaline is molded or allowed to solidify in trays, dishes, or other similar vessel, and then the solidified cake is broken into small fragments with the same object. Whichever of these methods is adopted there necessarily results great waste of material in the form of powder and of labor in remelting and remolding or resolidification of the powdered material, besides loss of time.

In reducing the naphthaline to manageable fragments according to first-mentioned method, a large amount of labor has to be expended in handling and chopping the candles, and in the latter method in breaking the blocks into small handy fragments and in sifting and separating these fragments from the powder produced unavoidably, and, moreover, both the candle and the block forms have been found very inconvenient in use—the "candle" form because pieces must be separately introduced into the carbureting-vessel, and the pieces or fragments, on account of the irregular or angular forms and projections, are liable to jam together and interfere with the most economical packing of the naphthaline, and thus prevent the maximum amount from being introduced into the vessels, at once increasing trouble; and, besides, in the effort to force the pieces into closer masses, an injury is often done to the fittings by the pressure in ramming the pieces. The "granular" form is inconvenient in use on account of its great liability to become spilled about the floors of rooms, warehouses, or other places, as well as over the exterior of the vessels used for the carbureting-chambers. This form of the matter is also liable to choke the internal tubes of the apparatus.

In order to avoid the above-mentioned inconveniences and losses, as well as to promote cleanliness, economy of time and labor in use, and ease and safety in handling, packing, and carriage, we mold the naphthaline into small spherical or substantially spherical shapes or balls of moderate and convenient size, preferably into spheres of about five-eighths of one inch in diameter, or from that, say, to one inch in diameter, that range of sizes being found to admit of the most convenient packing being effected in the sizes and forms of carbureting-vessels at present used; but the sizes may be varied to suit the vessels that are to receive them. The simplest form, that of the sphere, we find extremely convenient for most purposes; but allied oval or substantially round forms can be cast so long as angularities or prominences that would become detached or cause difficulty in release from the molds are avoided.

To attain rapid production of quantities of rounded ball or spherical forms of the naphthaline, we use molds constructed as separable plates, each of the plates having sunk into one or both faces the matrices of a number of half-balls, semi-ovals, hemispheres, or the like, each half-sphere or demi-mold in one plate having its fellow part mold in the other plate next it in series, the two halves of each recess correctly registering to give a correct whole ball, so that when—somewhat like the filter-plates of a filter-press as regards assemblage—these mold-plates are ranged on edge in a horizontal row and clamped tightly together these adjoining part molds coinciding form a series of cells, each connected to its neighbor in the row of cells by a small channel, said channels also being located half in each plate, thus forming over the surfaces adjacent of each pair of plates series of rows of cells, each in each vertical row, preferably, being confluent, and also connected with the supply-channel. The connecting-channels are found to facilitate release of the contained matter if two angles meeting inward (the point of meeting toward the center of the plate) are formed in each plate, the whole molding form of cross-section of the channel being approximately square in section, and also to cause readier separation on opening the molds of the balls from the connecting little sticks of naphthaline. The molten naphthaline having been poured into the molds, for which purpose we provide a vertical channel, half in each plate, as described, which communicates with other lateral channels, through which the molten matter flows to vertical channels connecting the series of molds arranged vertically in series, the molten matter flows up and displaces the air, which air escapes by suitable vents provided above in the molds. The molds thus constructed and adapted for producing balls of small size from the solidifying naphthaline in its cooling are prevented from acquiring the heat given off by the molten naphthaline by the provision of surrounding streams of cooling or refrigerating liquids conveyed through hollow parts or chambers in the molds, the streams being kept in circulation and renewal, so as to abstract the heat from and chill the naphthaline and prevent adhesion.

Figure 2:
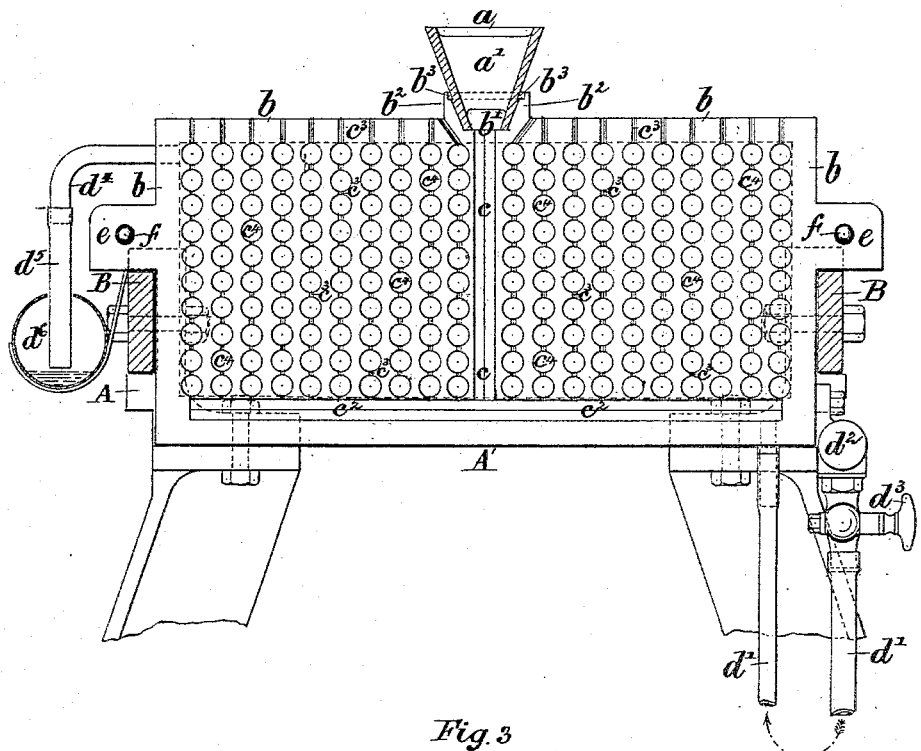
Figure 3:
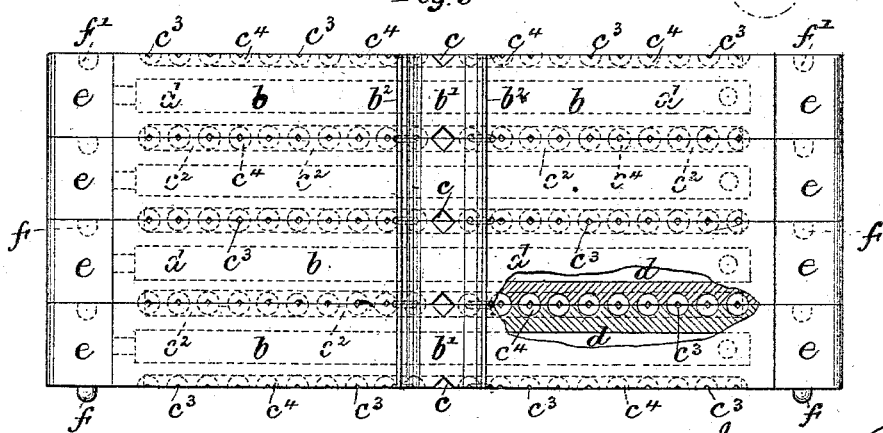

In the drawings, Figure 1 is a front view of the molding apparatus to a smaller scale of drawing than the succeeding figures. Fig. 2 is a transverse section of the molding apparatus to a larger scale. Fig. 3 is a plan view of parts of the molds, with a portion of two adjoining molds broken away to show the sectional form of the mold-cavities and connecting-throats, as also the water-spaces. Fig. 4 is a front view of the same with like portions broken away for the like purpose. Fig. 5 is a sectional plan view of one of the molds, and Fig. 6 is a corresponding sectional elevation. Fig. 7 is a general plan of the apparatus closed ready for use.

$a$ is a removable funnel-trough, which is fitted into the channel $b'$, formed by the walls $b^2$ of the molds $b$.

$c$ is the vertical downflow-channel from the channel $b'$. $c^2$ are horizontal distributing-channels therefrom, and $c^3$ are throats or links of channel between this channel $c^2$ and mold-chambers $c^4$, and between each chamber $c^4$ and its neighbor, and between each uppermost chamber $c^4$ and the exterior of the upper casing for flow out of the air and then of the naphthaline, the supply of naphthaline of course being stopped as soon as the chambers $c^4$ are all filled.

$a'$ are cross-ribs in the trough $a$ to hold the walls thereof together.

$b^3$ is a notch or recess longitudinally and transversely between the upper inner walls of the channel $b'$ and the outside of the trough $a$, said recess forming a catch or gutter for overflowing naphthaline that may escape the trough.

$d\ d$ are spaces within each part mold for containing cooling-liquid, the flow of which thereinto is effected from a series of inlet-pipes, $d'$, from a supply-pipe, $d^2$, controlled by a tap, $d^3$, one to each pipe. The pipes $d'$ are flexible india-rubber tubing fitting metal unions, so as to admit of the movements horizontally of each mold-plate $b$ from its neighbor, as required for filling and emptying the spaces. After absorbing heat from the molds the water or refrigerating-fluid passes off by pipes $d^4$, preferably having flexible extensions $d^5$, delivering into a conduit, $d^6$, for recooling and reuse or to run off.

The molds $b$ have their supports in the horizontal framing-bars A A and side bars, B B, which latter serve as the rails on which the ears or lugs $e\ e$ of the molds $b$ run in traversing, when being closed together in tightly-packed series or opened out.

$f$ are round pegs or other suitably-shaped steady-pins to take into corresponding holes, $f'$, of an adjoining surface, each plate $b$ having one of each.

The naphthaline enters by the channel $c$ into $c^2$, thence rises by the gets $c^3$ into mold-spaces $c^4$, driving the air before it until, all being filled, the pressure-screw D is turned by its handle-wheel D', so as to release the plates $b$, which by its aid had been pressed hard against the end frame, E, as an abutment, the rails A A acting as tie-bars, they being bolted to the frame E at A' and to the frame F, which carries the bearing and screw-socket for the screw D, at A².

The angular form in cross-section of vertical channels and horizontal distributing-channels and the gets $c^3$ facilitates the freeing of the connectors from the molds in a most effective manner.

Having now particularly described and ascertained the nature of our said invention and in what manner the same is to be performed, we declare that what we claim is—

1. In apparatus for molding naphthaline for use as set forth, a series of separable mold-plates having in their faces a number of recesses or cavities registering with those of the next adjacent plate, these plates being ranged on edge and clamped tightly together, the recesses communicating by small channels made in the mold, the structure also being provided with receiving and guiding channels, with cooling-pipes, and with chambers $d$ in each part mold, substantially as set forth.

2. The described apparatus for forming naphthaline into ball forms, consisting of the combination of a receiving-trough, the molds $b$, having cooling-chambers $d$ therein, distributing-channel $b'$, channel $c$, and mold-recesses $c^4$, substantially as shown and described.

In testimony whereof we, the said HENRY JAMES FENNER and GEORGE HAMILTON FENNER, have hereunto set our hands this 2d day of August, 1888.

HENRY JAMES FENNER.
  GEORGE HAMILTON FENNER.

Witnesses:
  GEO. J. B. FRANKLIN,
  G. W. WESTLEY,
*Both of 17 Gracechurch Street, London, E. C.*